United States Patent
Noll

(10) Patent No.: US 11,292,513 B2
(45) Date of Patent: Apr. 5, 2022

(54) SYSTEM AND METHOD FOR DETECTING A STEERING ENGAGEMENT BY A DRIVER

(71) Applicant: AUDI AG, Ingolstadt (DE)

(72) Inventor: Andreas Noll, Freystadt (DE)

(73) Assignee: AUDI AG, Ingolstadt (DE)

( * ) Notice: Subject to any disclaimer, the term of this patent is extended or adjusted under 35 U.S.C. 154(b) by 376 days.

(21) Appl. No.: 16/567,203

(22) Filed: Sep. 11, 2019

(65) Prior Publication Data
US 2020/0086912 A1    Mar. 19, 2020

(30) Foreign Application Priority Data
Sep. 14, 2018  (DE) .......................... 102018215640.9

(51) Int. Cl.
*B62D 6/00*       (2006.01)
*B62D 5/00*       (2006.01)
*B62D 7/00*       (2006.01)
*B62D 15/02*      (2006.01)

(52) U.S. Cl.
CPC ............... *B62D 6/00* (2013.01); *B62D 5/00* (2013.01); *B62D 7/00* (2013.01); *B62D 15/02* (2013.01)

(58) Field of Classification Search
CPC ........ B62D 6/00; B62D 6/005; B62D 15/024; B60W 10/20
See application file for complete search history.

(56) References Cited

U.S. PATENT DOCUMENTS

| | | | | |
|---|---|---|---|---|
| 7,539,566 | B2 * | 5/2009 | Tange ................ | B60T 8/17557 701/300 |
| 2007/0260383 | A1 * | 11/2007 | Sundaram ......... | B60W 50/0205 701/70 |
| 2015/0151784 | A1 * | 6/2015 | Moretti ............... | B62D 15/024 701/41 |
| 2015/0360715 | A1 * | 12/2015 | Shimizu .............. | F16D 27/00 701/43 |
| 2016/0132055 | A1 * | 5/2016 | Matsuno ............. | B60W 10/184 701/23 |

FOREIGN PATENT DOCUMENTS

| | | |
|---|---|---|
| CN | 101746412 A | 6/2010 |
| CN | 102039928 A | 5/2011 |
| CN | 106394676 A | 2/2017 |

(Continued)

OTHER PUBLICATIONS

Korean Office Action dated Jun. 12, 2020, in connection with corresponding KR Application No. 10-2019-0112823 (12 pp., including machine-generated English translation).

(Continued)

*Primary Examiner* — Tan Q Nguyen
(74) *Attorney, Agent, or Firm* — Maier & Maier, PLLC

(57) ABSTRACT

A method for detecting a steering engagement by a driver in a vehicle without a steering wheel sensor system, in which at least one steering sensor associated with a steering system of the vehicle, which sensor is associated either with the steering wheel or with a steering linkage of the vehicle, is used to capture a first application of force into the steering system of the vehicle, in which at least one chassis sensor associated with at least one chassis component of the vehicle is used to capture a second application of force onto the at least one chassis component.

8 Claims, 1 Drawing Sheet

(56) References Cited

FOREIGN PATENT DOCUMENTS

| DE | 102007039332 A1 | | 2/2008 | | |
|---|---|---|---|---|---|
| DE | 102008026730 A1 | | 12/2009 | | |
| DE | 102011002997 A1 | | 7/2012 | | |
| DE | 102011011319 A1 | | 8/2012 | | |
| DE | 102013218721 A1 | | 5/2014 | | |
| DE | 102013211052 B3 | | 12/2014 | | |
| DE | 10 2014 208 862 A1 | | 11/2015 | | |
| DE | 10 2015 118 882 A1 | | 12/2016 | | |
| JP | 2016-088383 A | | 5/2016 | | |
| JP | 2016088383 A | * | 5/2016 | ............ | B60W 50/10 |
| JP | 2017-154623 A | | 9/2017 | | |
| JP | 2017154623 A | * | 9/2017 | | |
| JP | 2017154623 A | | 9/2017 | | |
| KR | 10-2013-0048411 A | | 5/2013 | | |
| KR | 20130048411 A | * | 5/2013 | | |
| KR | 20130048411 A | | 5/2013 | | |

OTHER PUBLICATIONS

German Search Report dated Oct. 10, 2021, in connection with corresponding German Application No. 10 2018 215 640.9 (8 pp., including machine-generated English translation).
Chinese Office Action dated Aug. 25, 2021, in connection with corresponding Chinese Application No. 201910856926.3 (18 pp., including machine-generated English translation).
German Examination Report dated Mar. 25, 2019 in corresponding German Application No. 10 2018 215 640.9; 20 pages.

* cited by examiner

SYSTEM AND METHOD FOR DETECTING A STEERING ENGAGEMENT BY A DRIVER

BACKGROUND

Due to the development of modern driver assistance systems and autonomous vehicles, systems and methods for monitoring a vehicle steering movement, in particular a so-called "hands-on/hands-off" detection, i.e. detecting a status in which a driver has his/her hands on the steering wheel or not, are increasingly required to control vehicle systems. Furthermore, a driver is obligated by law to be able to take over the steering of a respective vehicle from an assistance system or autopilot at any time after a certain warning period, such that monitoring the vehicle steering movement is mandatory for every steering driver assistance system or (partially) autonomous vehicle.

In known systems for "hands-on/hands-off" detection, a steering wheel is moved slightly to the left or to the right by means of a motor, such that a driver who has his/her hands on the steering wheel is forced and/or encouraged to track said movement with his/her hand. The tracking movement of the hand of the driver transfers a moment of force, i.e., a torque or a corresponding force, from the hand to a steering system of the vehicle. This moment of force transferred from the hand of the driver to the steering system can be detected by a steering sensor. In case such a moment of force is not detected following a movement of the steering wheel induced by means of the motor, the system for "hands-on/hands-off" detection recognizes a so-called "hands-off" situation, that is, a situation in which the driver's hands are not on the steering wheel. However, such a system for "hands-on/hands-off" detection only works on level roads, as the front wheels of a vehicle also can generate a measurable moment of force in the steering on uneven roads, which can lead to inaccurate findings. Furthermore, the drive train of a vehicle also can introduce an additional moment of force into the steering, which can distort the detection of the current steering situation of the driver.

DE 10 2008 026 730 A1 describes a system for detecting a steering situation of a driver by means of detecting manual torque, which is based on two sensors: one sensor on the steering wheel side and one sensor on a steering linkage side.

DE 10 2011 011 319 A1 describes a method for evaluating the attentiveness of a driver, in which steering movements by the driver are captured directly by means of an appropriate sensor system.

DE 10 2013 218 721 A1 describes a method for reducing steering torques of a steering system of a vehicle, in which a driver torque exerted by a driver is detected by appropriate sensors.

SUMMARY

In this context, the object underlying the disclosure presented here is to provide a cost-effective and robust option for detecting a current steering situation.

Thus, a system is presented for detecting a steering engagement by a driver in a vehicle without a steering wheel sensor system, i.e., without a special sensor integrated in a steering wheel for capturing a steering engagement by a driver. The system therein comprises at least one steering sensor associated with a steering system of the vehicle for capturing a first application of force onto the steering system of the vehicle. The at least one steering sensor therein is associated either with a steering wheel or with a steering linkage of the vehicle. Furthermore, the system comprises at least one chassis sensor associated with at least one chassis component, such as a wheel, of the vehicle for capturing a second application of force onto the at least one chassis component, and a control device. The control device is configured to perform a comparison between a steering status resulting from respective values of the first application of force captured by the at least one steering sensor during a defined time period and a chassis status resulting from respective values of the second application of force captured by the at least one chassis sensor during the defined time period, to identify a steering situation on the basis of the comparison, and to report the identified steering situation to at least one vehicle component.

By respective vehicle sensors, such as the steering sensor and the chassis sensor, it is possible to not only measure respective steering wheel moments of force as values of the first application of force, but also detect or measure respective drive-train-related moments of force on the chassis, or a spring deflection of a wheel, as values of the second application of force. Using respective energy levels, vibrations or similar available measurement values, i.e., a respective moment of force or application of force on the steering wheel and chassis, it is provided, according to the invention, to perform a balance calculation to identify the cause of a steering movement or identify a driver behavior. In case a chassis moment of force, i.e., a moment of force captured at a chassis component, is distinct from a steering moment of force, such as a moment of force captured at a steering system, a corresponding difference between chassis status and steering status, or a corresponding deviation, can be recognized and therefore classified by comparing the chassis status and the steering status.

In particular, the system presented here serves to recognize a so-called "hands-on" or "hands-off" steering situation.

In particular, it is provided that a software, or a corresponding evaluating algorithm for balance calculations, required to perform calculations for operating the system presented here can be executed on a single control device.

In one possible design of the system presented here, it is provided that the control device is configured, if the comparison indicates a difference between steering status and chassis status, to recognize a steering engagement by the driver as a steering situation and to report the same to the at least one vehicle component.

A difference between steering status and chassis status can be attributed to an influence by the driver, specifically by his/her hands, such that it can be assumed that a steering engagement took place. If the steering moment of force and chassis moment of force are balanced, no steering movement by the driver occurred.

The disclosure presented here in particular is based on the principle of balance calculation. This means that all forces captured by at least one sensor, such as vibrations and/or rotary movements of a chassis component induced by the roadway enter into a chassis status, i.e., a mathematical representation of all forces acting upon a chassis of the respective vehicle, which were detected by means of a chassis sensor, and are compared to a steering status, i.e., a mathematical representation of all forces acting upon a steering of the vehicle, which were detected by means of a steering sensor. Therein, the captured values of forces acting upon the steering or the chassis, respectively, can be summed or integrated to a steering status or chassis status, respectively, and subsequently can be compared to each other in the balance calculation, or balancing, for example by subtraction or by forming quotients. Of course, any other suitable mathematical procedure for determining the balance or the comparison also can be used.

If the chassis status and the steering status do not match, it can be assumed that the at least one steering sensor captured a steering moment of force transferred into the steering system of the vehicle by the driver. Accordingly, if the balance of steering status and chassis status is not even, i.e., if the chassis status and the steering status show a difference, for example, which is greater than a defined threshold value, or if the chassis status and the steering status result in a quotient, for example, which is greater than "1," it is provided, according to the invention, that a situation is recognized in which the driver is operating a steering wheel of the vehicle, i.e., that a so-called "hands-on" situation is present.

It is conceivable that a "hands-off" situation is recognized and reported any time the comparison of chassis status and steering steering status shows no difference.

A chassis component in the context of the component presented here is meant to be a part of a chassis of a vehicle, such as a wheel, a suspension strut, a wheel assembly, a suspension strut support, or a wheel hub.

A chassis sensor in the context of the disclosure presented here is meant to be a sensor for measuring or capturing forces or moments of force or energy acting upon at least one chassis component of a vehicle, i.e., for detecting corresponding values of forces or moments of force or energy acting upon the at least one chassis component.

A chassis sensor in particular can be used for measuring at least one of the following measurements: amount of spring deflection of a wheel, velocity of spring deflection of a wheel, acceleration of spring deflection of a wheel, body acceleration, body pitch rate, body roll rate, suspension mounting point acceleration, wheel hub acceleration.

A steering sensor in the context of the invention presented here is meant to be a sensor for measuring or capturing forces or moments of force or energy acting upon at least one steering component of a vehicle, i.e., for detecting corresponding values of forces or moments of force or energy acting upon the at least one steering component.

A steering sensor in particular can be used for measuring at least one of the following measurements: steering wheel angle, steering moment of force, steering wheel velocity.

In case the balance between steering status and chassis status is not even, it is provided that a steering engagement by the driver is reported to at least one vehicle component. For this purpose, a control command can be generated, for example, and can be transmitted to the at least one vehicle component, which can be a hardware module and/or a software module, for example. The control command can activate or deactivate a function of the respective vehicle, for example, such that the function of the vehicle is only activated, for example, if a specific driver situation is detected. In particular, it is provided that a changeover to a manual driving operation only is performed, for example, if a "hands-on" situation is reported or detected at the time.

The disclosure presented here makes it possible to detect a steering engagement by a driver by means of a steering sensor, which is associated either with the steering wheel or with a steering linkage of the vehicle. Accordingly, the use of the invention presented here makes it possible to forgo a multiple-sensor arrangement having a steering sensor on the steering wheel and a steering sensor on the steering linkage, as is common for a manual torque detection. In particular, the use of the invention presented here makes it possible to forgo the use of a sensor system directly in the steering wheel, which is provided to detect a driver behavior. Accordingly, the invention presented here makes it possible to reliably recognize a steering behavior of a driver with minimal requirements to a sensor configuration of a vehicle.

In one possible design of the system presented here, the chassis status is captured with only one chassis sensor and/or the steering status is captured with only steering sensor.

In particular, it is provided that the disclosure presented here works by exclusively using the standard sensor system of a vehicle. This means that, for a standard model of a vehicle, the manufacturer can use the sensors already arranged in the vehicle as steering sensors and chassis sensors in the sense of the disclosure presented here. Accordingly, the system presented here can be operated without additional sensors, for example by loading an evaluating algorithm or an evaluating logic of the system presented here into a control device of a vehicle, such that the control device of the vehicle turns into the control device provided according to the invention.

It is provided in the disclosure presented here that the chassis status or, respectively, the steering status, is detected via at least one respective sensor, such as the at least one steering sensor or, respectively, the at least one chassis sensor. For this purpose, at least one application of force or torque, or a plurality of applications of force or torque, captured at a corresponding respective sensor over a defined time period can be used for detecting a respective status. Alternatively, at least one application of force or torque, or a plurality of applications of force or torque captured at a plurality of corresponding respective sensors over a defined time period can be used for detecting the respective status.

In one possible design of the system presented here, it is provided that the control device is configured to infer an intensity, i.e., a force or a torque, for example, of the steering engagement by the driver based on the comparison.

If the chassis status and steering status are not balanced, an intensity of a steering engagement by the driver can be determined based on a corresponding difference, i.e., on the basis of a differential value or a quotient of chassis status and steering status, for example. For this purpose, the differential value or the quotient can be assigned to a force value or a value of a corresponding torque on the basis of an assignment table.

In another possible design of the system presented here, it is provided that the control device is configured to perform a classification regarding a steering situation from a specified list of steering situations on the basis of the comparison.

If the chassis status and steering status are not balanced, a type of a current steering situation can be determined based on a corresponding comparison or difference, i.e., on the basis of a differential value or a quotient of chassis status and steering status, for example. For this purpose, the differential value or the quotient, individually or together with other differential values or quotients which, for example, were detected during a time period preceding the current time period, can be assigned to a defined steering situation from a list of a plurality of steering situations by means of a machine-learning device and/or based on an assignment table, for example. In particular, it can be inferred on the basis of the comparison whether a driver currently has just engaged with the steering wheel or has been providing steering commands for a while, i.e. has been engaging with the steering wheel for a while.

In another possible design of the system presented here, it is provided that the control device is configured to perform a classification regarding a "hands-on" or "hands-off" steering situation on the basis of the comparison.

If the chassis status and steering status are not balanced, a "hands-on" or "hands-off" steering situation can be classified based on a comparison or a corresponding difference, i.e., on the basis of a differential value or a quotient of chassis status and steering status, for example. For this purpose, it can be provided, for example, if the comparison shows an application of force onto the steering system or an application of torque onto the steering wheel, respectively, which is greater than an application of force or an application of torque onto a respective chassis component, that a "hands-on" situation is recognized automatically, or that it is assigned to the corresponding difference.

In another possible design of the system presented here, it is provided that the control device is configured to move the steering wheel of the vehicle by a specified range by means of a motor and to determine a "hands-on" or a "hands-off" steering situation in reaction to the movement executed by means of the motor.

As a movement of a steering wheel by a motor triggers a subsequent movement by a driver if the driver currently is in a "hands-on" situation, the difference between the steering status and the chassis status in a time period during or immediately after the steering wheel movement initiated by the steering motor can be used to infer whether the driver currently is in a "hands-on" situation. Should no difference be detectable between the chassis status and the steering status after a movement initiated by the motor, it can be inferred that the driver is or was in a "hands-off" situation at the time of the activity of the motor.

Furthermore, the disclosure presented here relates to a method for detecting a steering action by a driver in a vehicle without a steering wheel sensor system, in which at least one steering sensor associated with a steering system of the vehicle, which sensor is associated either with the steering wheel or with a steering linkage of the vehicle, is used to capture a first application of force onto the steering system of the vehicle. According to the method presented here, at least one chassis sensor associated with at least one chassis component of the vehicle is used for capturing a second application of force onto the at least one chassis component, and a control device is used to perform a comparison between a steering status resulting from respective values of the first application of force captured by the at least one steering sensor during a defined time period and a chassis status resulting from respective values of the second application of force captured by the at least one chassis sensor during the defined time period. Furthermore, a steering situation is identified and the steering situation is reported to at least one vehicle component.

The method presented here in particular serves to operate the system presented here in a vehicle.

In one possible design of the method presented here, it is provided, if the comparison indicates a difference, that a steering engagement by the driver is recognized as a steering situation and is reported to the at least one vehicle component.

Furthermore, the disclosure presented here relates to a computer program product with a computer program with program code means, which configure a computing unit, such as a control device of a vehicle, to execute the method according to the disclosure when the computer program is executed on the computing unit, in particular on a control device of a vehicle.

BRIEF DESCRIPTION OF THE DRAWINGS

The disclosure is shown schematically in the drawings on the basis of an embodiment and is schematically described in more detail with reference to the drawings.

FIG. 1 shows a system 10 of a vehicle. The system 10 serves to detect a steering engagement by a driver.

DETAILED DESCRIPTION

Figure 1:
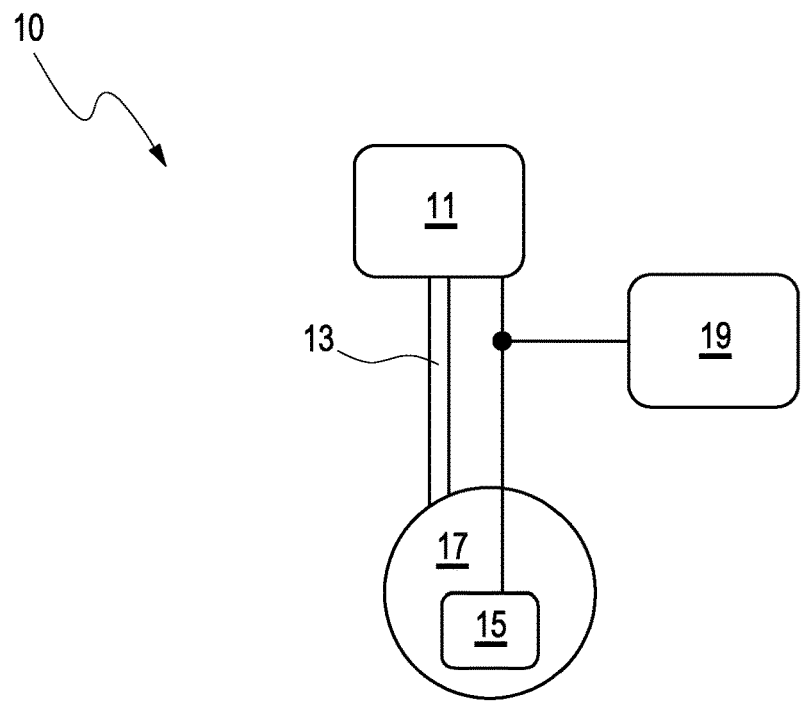
FIG. 1 shows a schematic representation of a possible embodiment of the system according to the invention.

The system 10 comprises a steering sensor 11, which is arranged on a steering linkage 13. The steering sensor 11 serves to capture forces or moments of force acting upon the steering linkage 13, that is, to determine their respective values. Accordingly, the steering sensor 11 can be designed as a torque sensor, for example.

Furthermore, the system 10 comprises a chassis sensor 15, which is arranged on a wheel 17 of the vehicle. The chassis sensor 15 serves to capture forces or moments of force acting upon the wheel, that is, to determine their respective values. Accordingly, the chassis sensor 15 can be designed as a torque sensor, for example.

To detect and/or to classify a steering engagement by a driver, the control device 19 compiles a chassis status of forces acting upon the wheel 17, specifically from respective values captured during a defined time period of the forces acting upon the wheel 17. For this purpose, the control device 19 analyzes values of the forces or energy captured by the chassis sensor 15. Furthermore, the control device 19 compiles a steering status of forces acting upon the steering linkage 13, specifically from respective values captured during a defined time period of the forces acting upon the steering linkage 13. For this purpose, the control device 19 analyzes values of the forces or energy captured by the steering sensor 11. A respective analysis of the respective values can be performed by summing the respective values.

During a comparison, or during a balance, the chassis status is compared to the steering status by the control device 19. For this purpose, the control device 19 can calculate a difference or a quotient between the chassis status and the steering status, or between the steering status and the chassis status.

If the comparison of the chassis status with the steering status shows that the balance between chassis status and steering status is not even, i.e., if the chassis status and the steering status are not balanced, i.e., that a differential value is determined, for example, which is greater than a defined threshold value, the control device 19 is configured to identify a steering engagement by the driver and to report the steering engagement to a vehicle component, such as a central control device of the vehicle.

Figure 2:
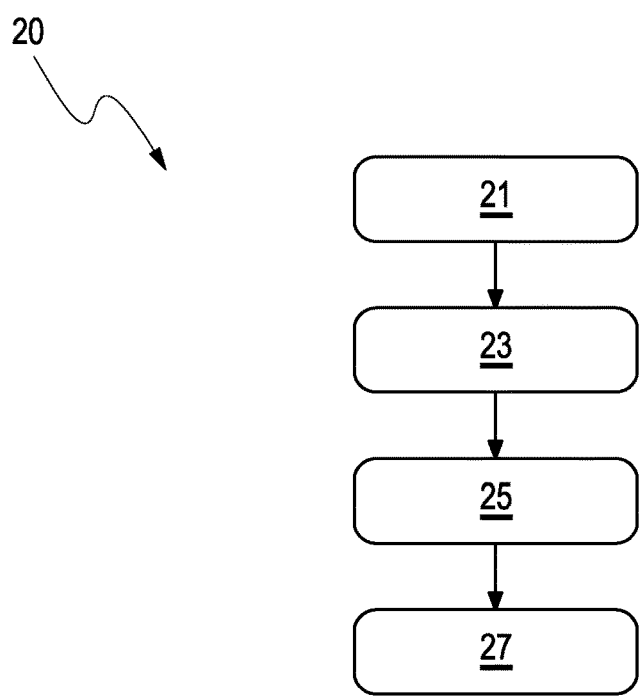
FIG. 2 shows a schematic representation of a possible embodiment of the method according to the invention.

FIG. 2 shows a process chart 20 of a possible design of the method presented here.

The method starts with an initial step 21, in which sensor information is detected by a first chassis sensor at a wheel of a respective vehicle and by a second chassis sensor at a suspension strut of the wheel at a time $t_0$. The first chassis sensor can capture a torque transferred to the wheel by a steering system, for example, and the second chassis sensor a vibration transferred to the wheel by a roadway, for example.

Additionally, sensor information is detected by a steering sensor at a steering linkage of the vehicle during the initial step at the time $t_0$.

During a processing step 23, the sensor information or values captured both by the first chassis sensor and by the second chassis sensor as well as the sensor information or values captured by the steering sensor are processed by a control device. For this purpose, the control device calculates a chassis status based on the sensor information or captured values from the first chassis sensor and the second chassis sensor, for example by summing the captured values from the first chassis sensor and the second chassis sensor, wherein a weighted summation also is possible, and calculates a steering status based on the sensor information or captured values from the steering sensor, for example by summing the captured values from the steering sensor.

During a comparison step 25, the chassis status is compared to the steering status. Herein, a difference between the chassis status and the steering status is calculated, for example. Accordingly, the control device calculates a difference between the chassis status and the steering status, or performs a comparison between the two.

During a classification step 27, a driver situation or, correspondingly, a steering situation, at the time $t_0$ is classified based on the difference calculated during the comparison step 25. For this purpose, it can be provided, if the difference is "0" or falls below a defined threshold value, that a so-called "hands-off" situation, i.e., a situation in which the driver is driving, or riding, with his/her hands off the steering wheel, is detected, and, if the difference is above a certain threshold value or is equivalent to the threshold value, that a so-called "hands-on" situation, i.e., a situation in which the driver is driving with his/her hands on the steering wheel, is classified or detected.

The invention claimed is:

1. A system for detecting a steering engagement by a driver in a vehicle without a steering sensor system, comprising:
    at least one steering sensor associated with a steering system of the vehicle for capturing a first application of force into the steering system of the vehicle, wherein the at least one steering sensor is allocated either to the steering wheel or to a steering linkage of the vehicle;
    at least one chassis sensor associated with at least one chassis component of the vehicle and at least one second chassis sensor associated with a second chassis component of the vehicle for capturing a second application of force onto a chassis of the vehicle, wherein the second application of force is a summation of values read by the at least one first chassis sensor and the at least one second chassis sensor; and
    a control device,
    wherein the control device is configured to perform a comparison between a steering status resulting from respective values of the first application of force captured by the at least one steering sensor during a defined time period and a chassis status resulting from respective values of the second application of force captured by the at least one chassis sensor and the at least one second chassis sensor during the defined time period, to identify a steering situation on the basis of the comparison, and to report the identified steering situation to at least one vehicle component,
    wherein the control device is configured to perform a classification regarding a hands-on or hands-off steering situation on the basis of the comparison, wherein the control device is configured to move the steering wheel of the vehicle by a defined range by a motor and to perform the classification regarding the hands-on or hands-off steering situation in reaction to the movement executed by the motor.

2. The system according to claim 1, wherein the control device is configured, if the comparison indicates a difference between steering status and chassis status, to recognize a steering engagement by the driver as a steering situation and to report the same to the at least one vehicle component.

3. The system according to claim 2, wherein the control device is configured to infer an intensity of the steering engagement by the driver from the comparison.

4. The system according to claim 3, wherein the control device is configured to perform a classification regarding a steering situation from a specified list of steering situations on the basis of the comparison.

5. The system according to claim 4, wherein the control device is configured to perform a classification regarding the steering situation from a defined list of steering situations on the basis of the comparison over a defined time period.

6. The system according to claim 1, wherein the control device is configured to perform the comparison by calculating the difference between the steering status and the chassis status or by division of the steering status and the chassis status.

7. A method for detecting a steering engagement by a driver in a vehicle without a steering wheel sensor system, in which at least one steering sensor associated with a steering system of the vehicle, which sensor is associated either with a steering wheel or with a steering linkage of the vehicle, is used to capture a first application of force into the steering system of the vehicle,
    in which at least one chassis sensor associated with at least one chassis component of the vehicle and at least one second chassis sensor associated with at least one second chassis component is used to capture a second application of force onto a chassis of the vehicle, wherein the second application of force is a summation of values read by the at least one first chassis sensor and the at least one second chassis sensor, and
    in which a control device is used to perform a comparison between a steering status resulting from respective values of the first application of force captured by the at least one steering sensor during a defined time period and a chassis status resulting from respective values of the second application of force captured by the at least one chassis sensor and the at least one second chassis sensor during the defined time period, to identify a steering situation, and to report the steering situation to at least one vehicle component,
    wherein the control device is configured to perform a classification regarding a hands-on or hands-off steering situation on the basis of the comparison, wherein the control device is configured to move the steering wheel of the vehicle by a defined range by a motor and to perform the classification regarding the hands-on or hands-off steering situation in reaction to the movement executed by the motor.

8. The method according to claim 7, wherein, in case the comparison indicates a difference, a steering engagement by the driver is recognized as a steering situation and is reported to the at least one vehicle component.

* * * * *